(12) United States Patent
Scolari et al.

(10) Patent No.: US 9,090,311 B2
(45) Date of Patent: *Jul. 28, 2015

(54) DERAILLEUR

(71) Applicant: ZIKE, LLC, Greenville, SC (US)

(72) Inventors: Nathan A. Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/801,933

(22) Filed: Mar. 13, 2013

(65) Prior Publication Data

US 2013/0252772 A1    Sep. 26, 2013

Related U.S. Application Data

(63) Continuation-in-part of application No. 12/898,817, filed on Oct. 6, 2010.

(51) Int. Cl.
*F16H 7/12* (2006.01)
*B62M 9/1242* (2010.01)
*B62M 9/04* (2006.01)
*B62M 9/124* (2010.01)
*B62M 9/125* (2010.01)
*B62K 3/00* (2006.01)

(52) U.S. Cl.
CPC .............. *B62M 9/1242* (2013.01); *B62K 3/002* (2013.01); *B62M 9/04* (2013.01); *B62M 9/124* (2013.01); *B62M 9/125* (2013.01); *B62M 2009/12406* (2013.01)

(58) Field of Classification Search
CPC ................. B62M 9/124–9/126; B62M 9/1242
USPC ........................................ 474/135, 80, 78, 82
See application file for complete search history.

(56) References Cited

U.S. PATENT DOCUMENTS

| 1,568,591 | A |   | 1/1926  | Fechner |        |
|-----------|---|---|---------|---------|--------|
| 3,583,249 | A | * | 6/1971  | Morse   | 474/80 |
| 3,847,028 | A | * | 11/1974 | Bergles | 474/80 |
| 4,286,953 | A |   | 9/1981  | Shimano |        |
| 4,410,198 | A |   | 10/1983 | Fernandez |      |
| 4,610,644 | A | * | 9/1986  | Nagano  | 474/82 |
| 4,731,045 | A | * | 3/1988  | Nagano  | 474/78 |
| 4,878,884 | A | * | 11/1989 | Romano  | 474/82 |
| 5,125,288 | A |   | 6/1992  | Amiet   |        |
| 5,152,720 | A |   | 10/1992 | Browning |       |
| 5,213,549 | A |   | 5/1993  | Blanchard |      |
| 5,672,133 | A |   | 9/1997  | Eden    |        |
| 7,326,137 | B2|   | 2/2008  | Van Der Linde |   |

(Continued)

*Primary Examiner* — Michael Mansen
*Assistant Examiner* — Michael Riegelman
(74) *Attorney, Agent, or Firm* — Douglas W. Kim; McNair Law Firm, P.A.

(57) ABSTRACT

The present invention is a derailleur for moving a chain to a different sized sprocket in a drive sprocket nest comprising: a feed arm for directing onto one of multiple sprockets within the drive sprocket nest when the feed arm is rotatably mounted at a pivot end onto a frame of a vehicle; a take up roller attached to the feed arm supporting the chain so that when the take-up roller moves laterally the chain moves from one sprocket to another sprocket in the drive sprocket nets; a roller feel sprocket supporting the chain so that the chain contacts over ½ the perimeter of the sprocket contacting the chain in the drive sprocket nest; an opposite chain guide end attached to the feed arm so that the chain guide end traces a path substantially parallel to a tangent to the outer periphery of the drive sprocket nests.

12 Claims, 14 Drawing Sheets

(56) References Cited

U.S. PATENT DOCUMENTS 7,722,488 B2 * 5/2010 Kunisawa et al. .............. 474/82
2002/0058558 A1 * 5/2002 Patterson et al. .............. 474/82
2009/0224506 A1 9/2009 Sakirov
2012/0088618 A1 * 4/2012 Scolari et al. ................. 474/135

* cited by examiner

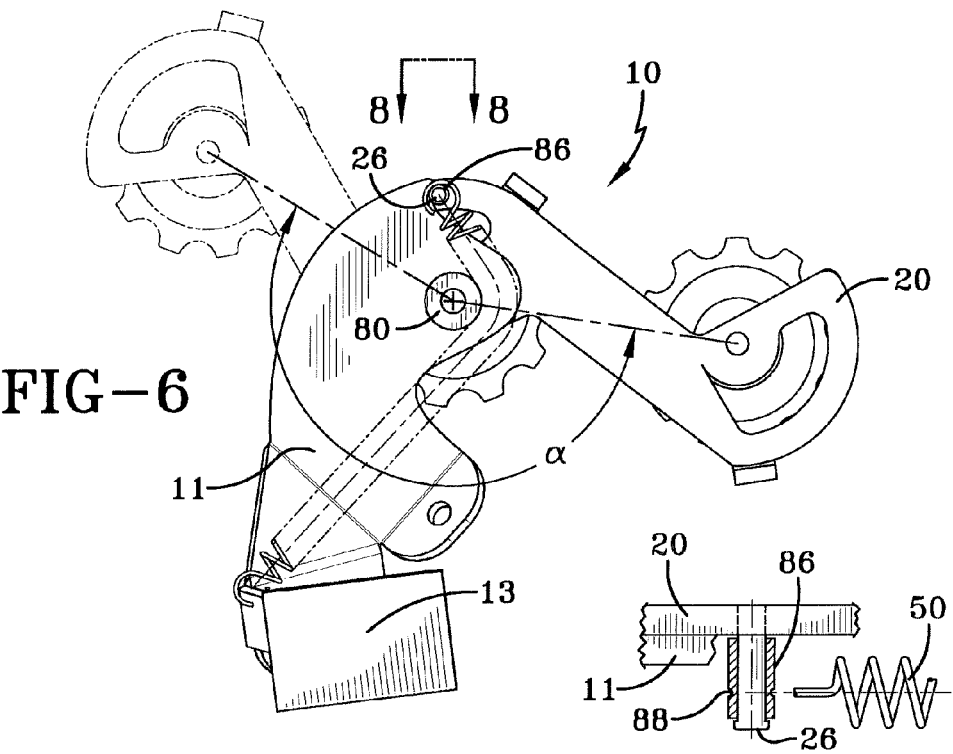
FIG-6
FIG-8
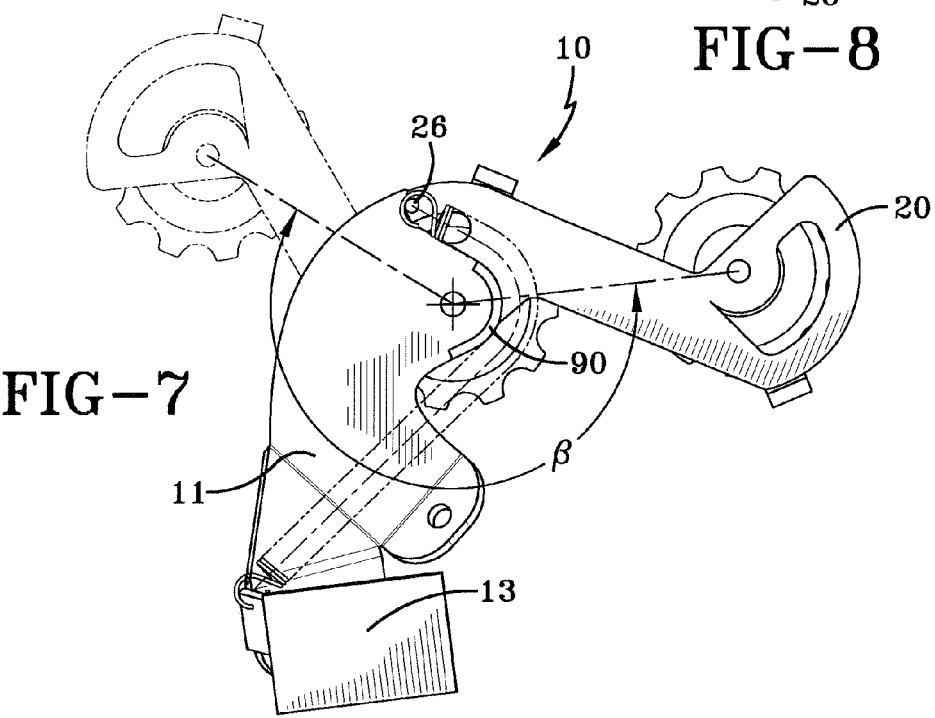
FIG-7

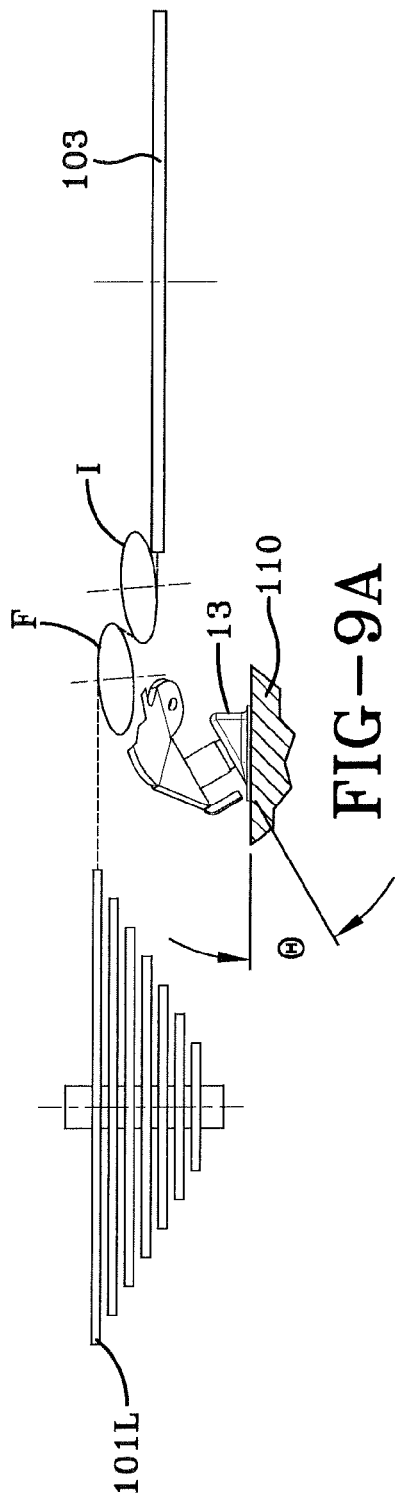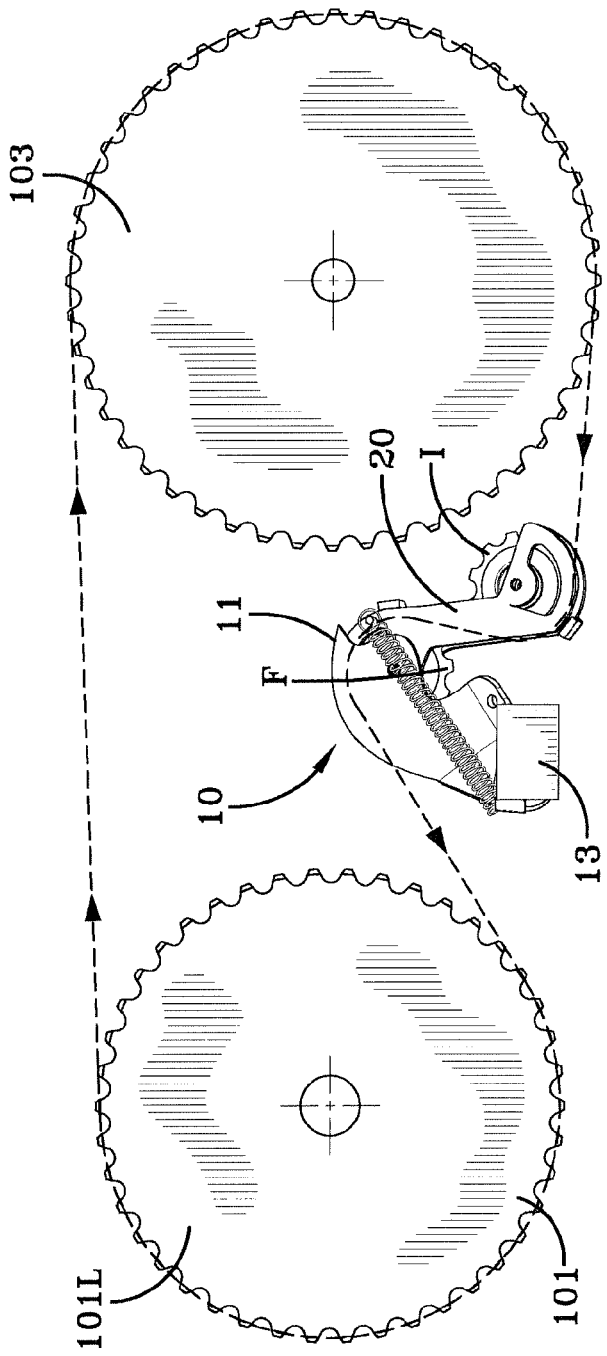

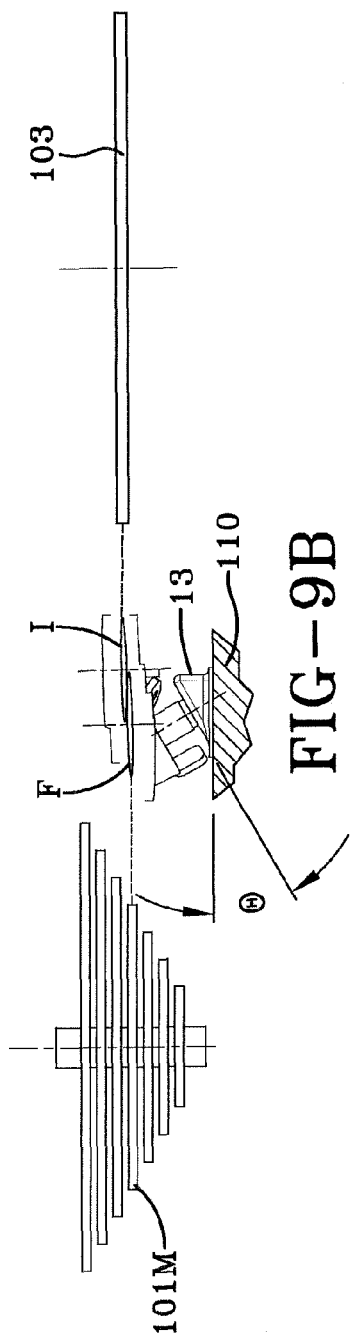
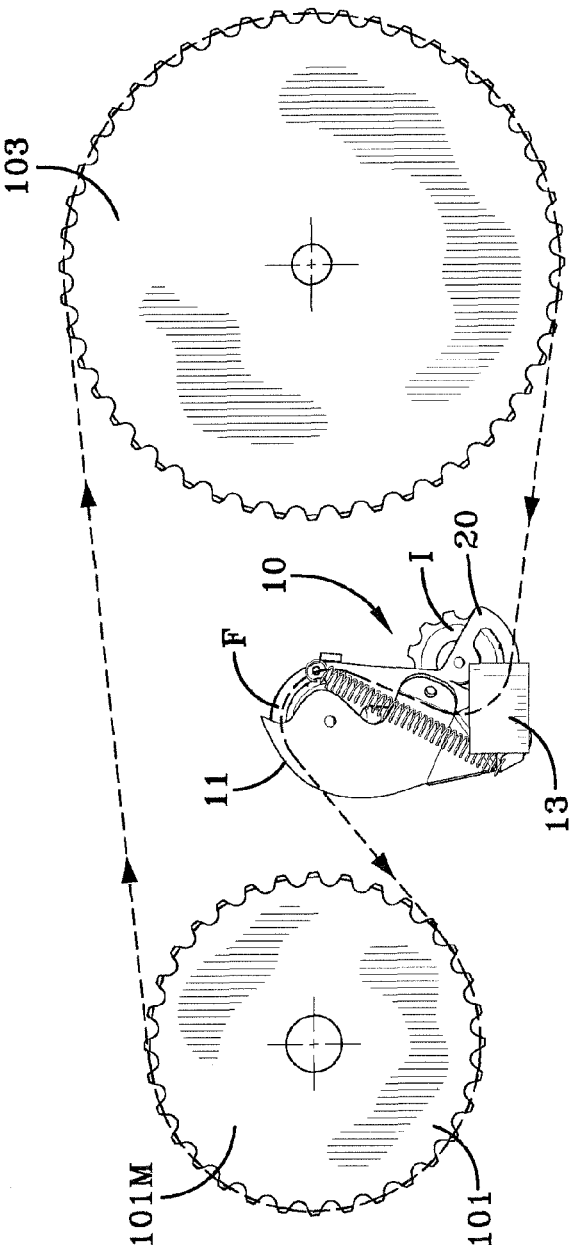

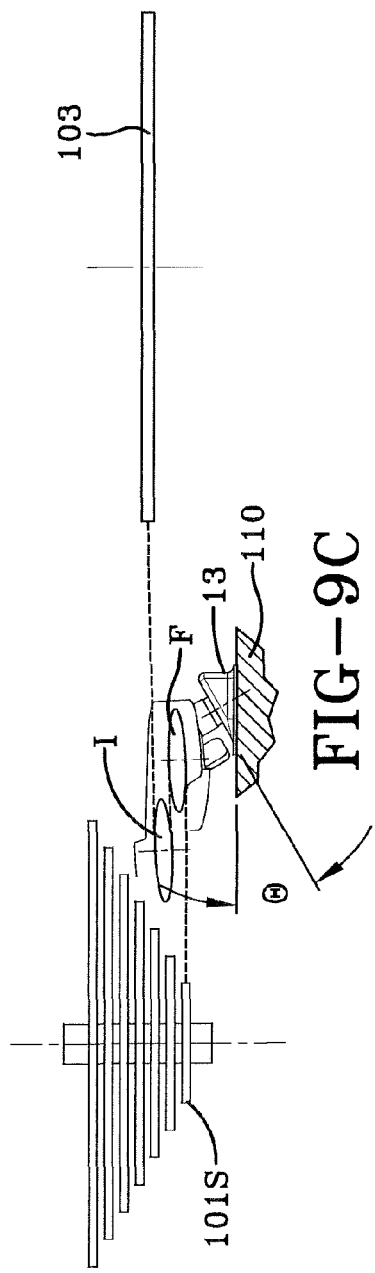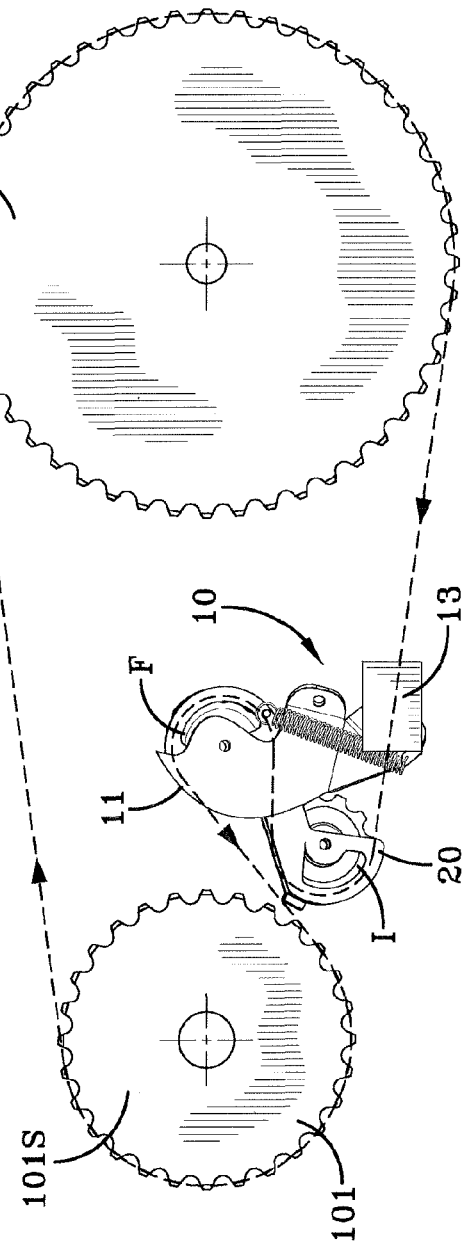

DERAILLEUR

CLAIM OF PRIORITY

This application is a continuation in part of co-pending U.S. application Ser. No. 12/898,817 filed on Oct. 6, 2012 entitled DERAILLEUR.

TECHNICAL FIELD

This application relates to a speed changing device for rider propelled vehicles using a chain drive and a sprocket nest with a plurality of different sized sprockets. The sprocket changing device is a pivoting derailleur system with a derailleur and a chain slack take-up mechanism.

BACKGROUND OF THE INVENTION

The derailleur system currently used in bicycles has been adequately engineered to allow the chain to smoothly move to an adjacent sprocket at selected locations around each sprocket. Each sprocket is modified to provide clearance for chain shifting with a small plurality of reduced size chain pickup teeth with modified shape at selected locations on the sprocket, but with adjacent normally sized teeth providing adequate chain grip and strength around the rest of the sprocket's outer periphery or circumference.

The chain travel is directed by a movement of the derailleur guiding the chain from the sprocket it is on and feeding the chain onto an adjacent larger sprocket when decreasing the speed or a smaller sprocket when increasing the speed.

The bicycle derailleur devices are physically mounted on the frame of the bicycle and its movement is generally operated by a guide wire or cable extending from a shifting lever attached on the handle bar to the derailleur. When the rider selects a new sprocket, he moves the lever moving the wire or cable which in turn repositions the derailleur to effect a sprocket change. The derailleur is a sophisticated device that has a fixed structure attached to the frame or rear axle and a movable structure that is held in position by at least one double pivot with multiple heavy duty springs that allow the movable elements to rotate or move in the path of a parallelogram created by two opposing plates hinged to move parallel relative to the other. This movement enables the chain guide portion of the derailleur to move relative to the sprocket nest in a relatively uniform path in relation to the guide and the sprockets while minimizing twisting the chain.

In order to function properly, the chain slack that exists when the chain is on the sprocket must be taken up. The amount of chain slack is reduced as the chain moves to larger sprockets. In bicycles, the derailleur chain guide system is positioned to extend well below the axle and frame. This enables the chain to serpentine through the low hanging derailleur guide system by having the chain extend well below the largest of the sprockets.

These prior art derailleur devices allow the chain to be moved along the various sized sprockets with relative ease. In U.S. Pat. No. 7,780,558 entitled "Bicycle Rear Derailleur" assigned to Shimano Inc.; a rather detailed description is provided of these rather sophisticated devices for changing sprockets on a bicycle. Shimano is a world leader in the manufacture of derailleurs and is known for providing some of the best devices for changing sprockets on chain driven bicycles. Their rear derailleurs are engineering marvels exhibiting good reliability and durability.

These excellent products, however, because they are so well made with much sophistication are costly. A need exists to provide a simpler, less complex derailleur design that is reliable and durable.

Recently, a new generation of scooters and bicycles has been developed with reciprocating foot pedals. These vehicles, particularly the scooters, have frames that have a very low center of gravity to make the vehicles more stable. The frames are so low to the ground that the prior art derailleurs conventionally positioned below the rear sprocket nest are virtually useless. Nevertheless, these vehicles need a shifting device to allow the rider to selectively change speeds.

It is therefore an objective of the present invention to provide a derailleur type device and chain slack take-up assembly that does not extend into the ground clearance of the vehicle. It was a further objective of the present invention to provide a reliable and less complex device that can be manufactured at an affordable cost.

It was still another objective of the present invention to provide a derailleur device with a large range of motion to facilitate the range of rear sprocket sizes in a single rear sprocket nest equivalent to present bicycle derailleurs.

Another objective of the invention is to have the chain feed to the derailleur chain take-up directed so as to be fed close to the centerline of the drive sprocket.

These and other features of the derailleur system of the present invention are described as follows.

SUMMARY OF THE INVENTION

A derailleur, for moving a chain to different sized sprockets arranged small to large in a sprocket nest is disclosed. The derailleur has a feed arm for directing the chain onto one of multiple sprockets within the sprocket nest. The feed arm is rotatably mounted at a pivot end on an angular pivot and when the feed arm rotates on the pivot an opposite chain guide end of the feed arm traces a path substantially parallel to a tangent to the outer periphery of the sprocket nest. The movement of the feed arm is mechanically driven by a user command and is preferably moved by a connected rod, wire or cable. The guide end of the derailleur has a chain guide, wherein the chain guide can be a smooth surface or a roller or toothed roller. The derailleur further has a chain slack take-up assembly having a pivotal take-up idler arm for chain slack take-up, which is pivotably connected to the chain guide end of the feed arm. Preferably, the feed arm and the pivotal take-up idler arm share a chain guide wherein the feed arm and idler arm are both spring loaded, preferably sharing the same spring wherein one spring biases both the feed arm and idler arm, the spring being connected to the idler arm and onto the angular pivoting feed arm.

One end of the spring is connected to the feed arm at or near the frame pivot, the opposite end of the spring is connected to the idler arm on a pin eccentric to the pivot biasing the idler arm providing the chain slack take-up, wherein the chain feed arm and take-up idler arm assemblies lie within a space between the driver sprocket and driven sprocket nest, the space defined as the area between the major diameter sprocket of the driver sprocket and driven sprockets.

A chain take-up assembly has a pivotal idler arm for taking up chain slack, the idler arm having a pair of chain guides, one being a feed guide, the other a take-up guide, at opposite ends to serpentine the chain through the guides; and a spring, pulling the idler arm to maintain chain tension; and wherein the excess chain slack is stored in the space between the driver and driven sprockets.

The assembly allows the chain to straighten when positioned on the largest sprocket pairs. The chain take up assembly lies within a space between the driver sprocket and driven sprocket nest, the space defined as the area between the major diameter sprocket of the driver sprocket and driven sprockets. The chain guides are smooth surfaces or rollers with or without teeth.

The present invention can include a derailleur for moving a chain to a different sized sprocket in a drive sprocket nest comprising: a feed arm for directing onto one of multiple sprockets within the drive sprocket nest when the feed arm is rotatably mounted at a pivot end onto a frame of a vehicle; a take up roller attached to the feed arm supporting the chain so that when the take-up roller moves laterally the chain moves from one sprocket to another sprocket in the drive sprocket nets; a roller feel sprocket supporting the chain so that the chain contacts over ½ the perimeter of the sprocket contacting the chain in the drive sprocket nest; an opposite chain guide end attached to the feed arm so that the chain guide end traces a path substantially parallel to a tangent to the outer periphery of the drive sprocket nests.

The take up roller can support the chain so that the chain contacts over ½ the perimeter of a pedal sprocket. The feed arm can cause the chain to move from a first pedal sprocket to second pedal sprocket once the chain is at the smallest sprocket of the drive sprocket nest so that the chain can be moved about the drive sprocket nest and the pedal sprocket with one derailleur. The feed arm causes the chain to move from a first pedal sprocket to second pedal sprocket once the chain is at the largest sprocket of the drive sprocket nest so that the chain can be moved about the drive sprocket nest and the pedal sprocket with one derailleur.

The movement of the feed arm can be moved by tensioning a first cable connected to the feed arm causing the take up roller to move in a lateral direction relative to a long axis of the frame of the vehicle causing the chain to move from one sprocket to another in the drive sprocket nest. The movement of the roller feed sprocket can be actuated by tensioning a second cable connected to the feed arm causing the roller feed sprocket to move in a lateral direction relative to a long axis of the frame of the vehicle causing the chain to move from one sprocket to another in a pedal sprocket nest.

The excess slack in the chain can be is taken up in a slack area defined by a horizontal tangent of the top perimeter of a pedal sprocket and a largest sprocket in the drive sprocket nest and a horizontal tangent of the bottom perimeter of a pedal sprocket and a largest sprocket in the drive sprocket nest. The slack area can be further defined by a horizontal tangent of the top perimeter of a largest sprocket of a pedal sprocket nest and a largest sprocket in the drive sprocket nest. The slack area can be further defined by a vertical tangent on a forward point of the largest sprocket of the sprocket nest and a vertical tangent on a rearward point of a pedal sprocket. The pivot end can be carried by the frame forward an axis defined through the drive sprocket nest.

BRIEF DESCRIPTION OF THE DRAWINGS

FIG. 6 is an alternative embodiment derailleur assembly with a hub projection to allow pivot rotation in excess of 180 degrees.

FIG. 7 is another alternative embodiment for over 180 degrees rotation of the derailleur with a lanced spring support.

FIG. 8 is a view of a top swivel connector for the spring.

FIGS. 9A, 9B and 9C are diagrammatic bottom views of the derailleur assembly showing the position of the feed chain path and the idler sprocket when the small, medium and large nest sprockets are engaged. The top portion of the chain is not shown for clarity.

FIGS. 10A, 10B and 10C are schematic views of the rear sprocket nest and front drive sprocket and the space between the sprockets in which the derailleur moves;

DETAILED DESCRIPTION OF THE INVENTION

Figure 1:
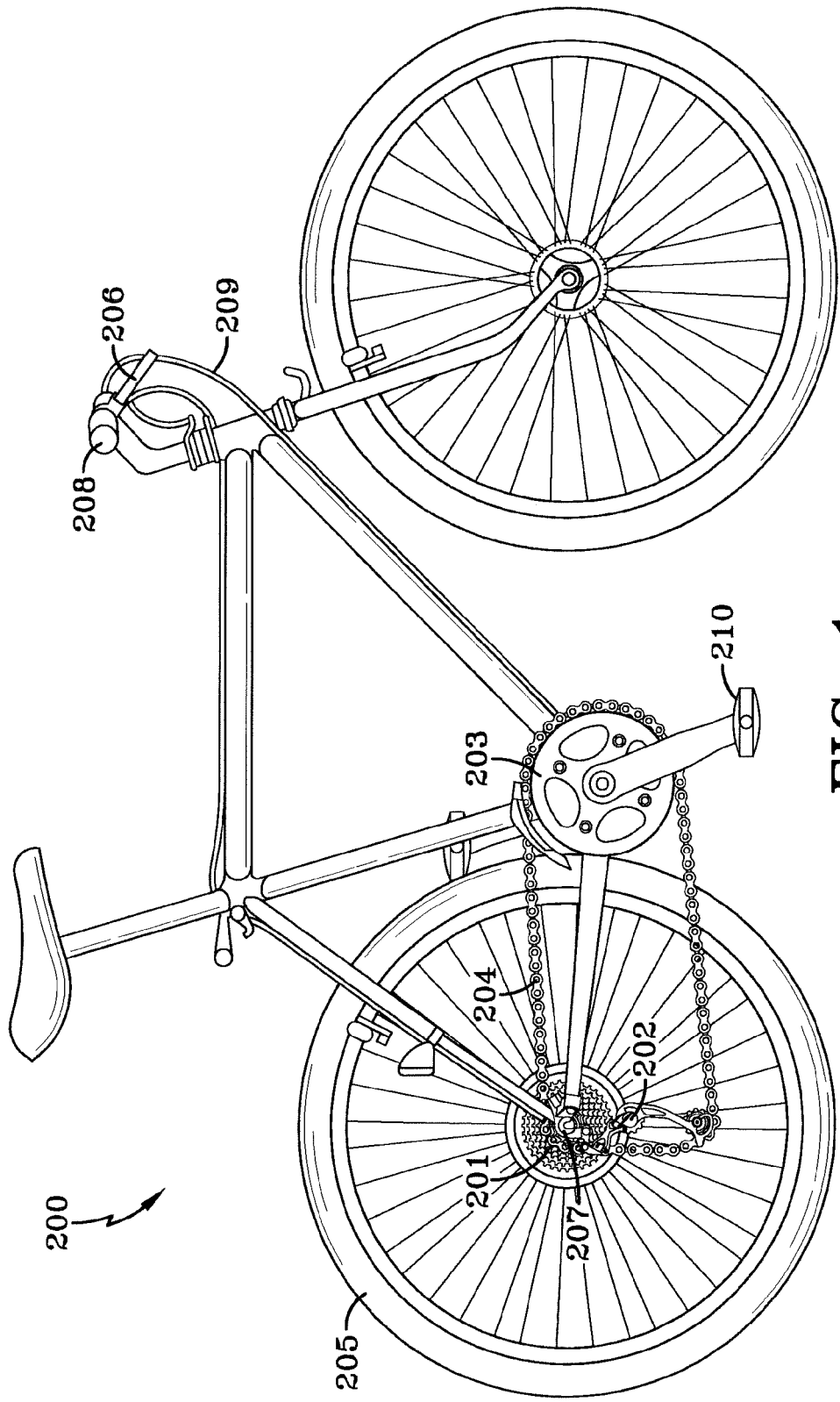
FIG. 1 shows a side view of a bicycle with a prior art rear derailleur for a bicycle shown.

FIG. 1 is a side view of a prior art single derailleur assembly 202 moved by a shift mechanism 206 and guide cable 209 at the handle bar 208 used on a bicycle 200. As can be seen the device is attached to the rear wheel hub and therefore positioned well below the rear wheel sprocket nest 201. This enables the chain 204 to extend from the forward drive sprockets 203 rearwardly with the chain 204 forming two almost parallel straight lines to the rear wheel 205 sprocket nest 201 and derailleur assembly 202. The derailleur assembly 202 is shown directly under the combination of the rear sprocket nest 201 and the rear axle 207 which means the lower part of chain 204 is positioned close to the ground as shown, but well above the lowest point on the pedal 210.

The revolution of the pedals 210 is a continuous 360 degree movement with the lowest point of the pedal stroke clearing the ground by several inches, thus providing adequate ground clearance during a severe leaning turn.

Figure 2:
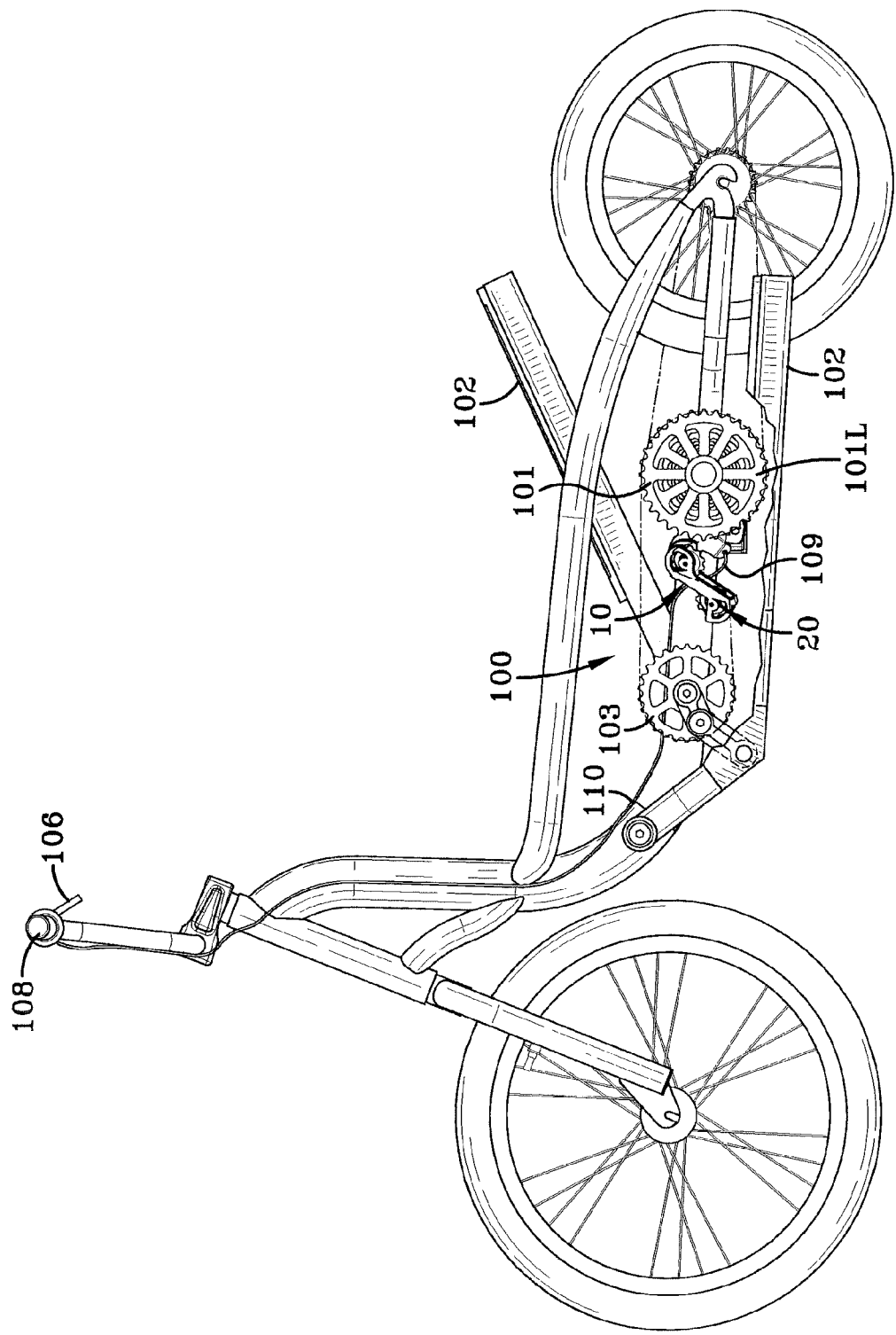
FIG. 2 is a side view of a bicycle with reciprocating pedals with the derailleur of the present invention shown in the large sprocket position.

With reference to FIG. 2, a reciprocating pedal bicycle 100 is illustrated. The bicycle has a low slung frame 110 with a pair of reciprocating foot pedals 102 that move up and down to provide forward propulsion. The ground clearance on both the frame and the bottom stroke of the foot pedals 102 is a mere few inches in some models. The reason for the low center of gravity is a desire to maintain superior ride stability with reduced rider's ability requirements. Those bicycles and in some versions, scooters can achieve excellent speeds which are best accomplished with the use of a gear shifting mechanism. As is readily apparent, conventional low hanging derailleur assemblies simply would drag on the ground unless the ground clearance was raised, sacrificing ride stability and the ability to design a low frame with a frame bottom adapted to ride down railings similar to techniques used in skateboarding.

To overcome this problem, an improved concept in gear shifting design was required that still utilized an existing gear shift mechanism 106 mounted on the handle bar 108 and a single shift cable 109.

Figure 3:
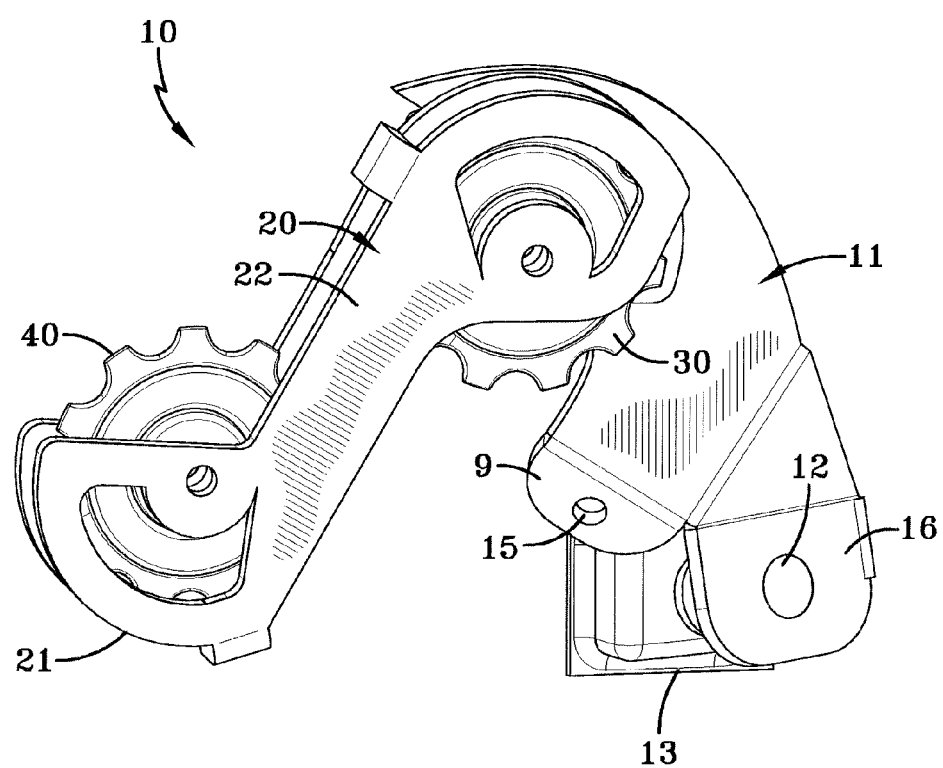
FIG. 3 is perspective view of the derailleur assembly with a chain slack take-up assembly oriented in the large sprocket feed position.
Figure 3A:
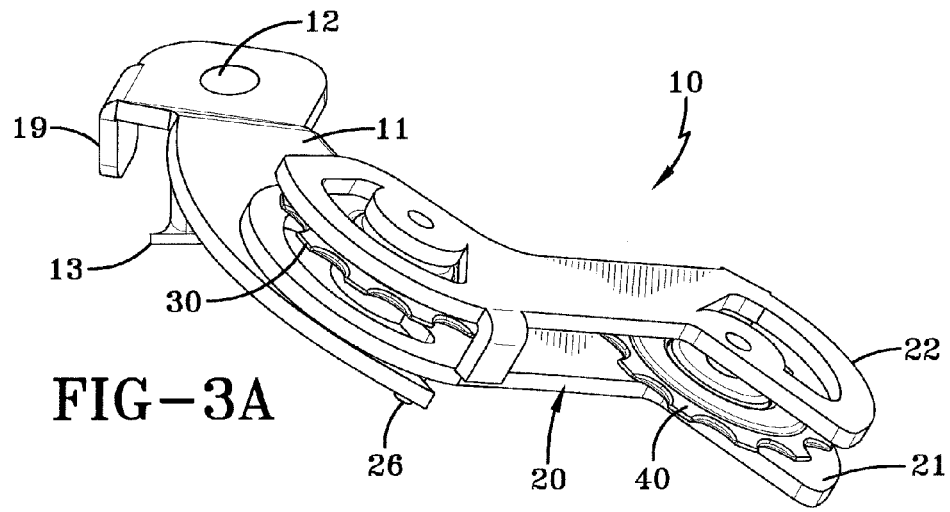
FIGS. 3A and 3B are a top view and a side view taken from FIG. 3.
Figure 3B:
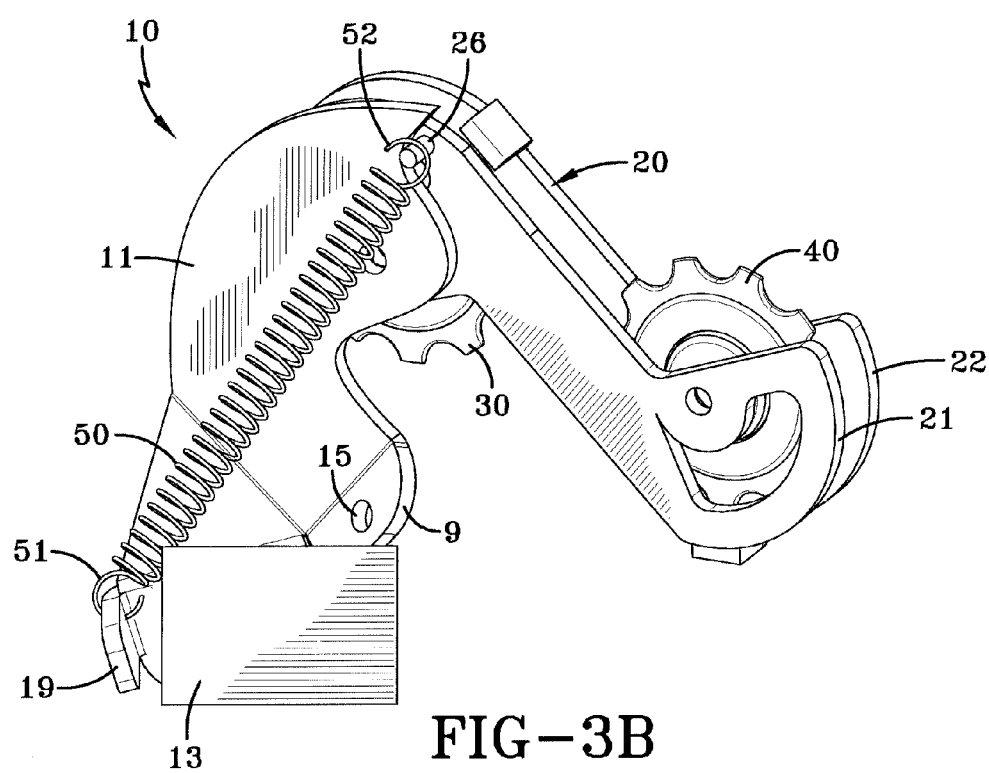

As shown in FIG. 2, and in greater detail in FIG. 3, a derailleur assembly 10 with a chain slack take-up assembly 20 is illustrated. A low-hung system such as scooters can not use a guide system that requires major clearance between the driven wheel center and ground, however, a system that utilizes the space beneath the top driving links of chain and above a line between the bottom of the largest nest sprocket 101 L and the bottom of the largest forward drive sprocket 103. As illustrated, the entire derailleur assembly 10 is located between the space of the largest or major diameter rear sprocket 101L of the sprocket nest 101 and the major diameter of the forward drive sprocket 103. Accordingly, an upper line and a lower line drawn between these major diameter forward and rear sprockets is all the space needed for the chain take-up and derailleur assemblies. As shown, the derailleur assembly 10 does not occupy the ground clearance space as required in the prior art devices, but rather is packaged between the pair of major diameter sprockets. This is a significant breakthrough in gear shift mechanisms because it dramatically reduces the vertical space required for the chain. The design is useful not only in low hung vehicles, but in any bicycle. Consider how many derailleurs have been bent or broken when they hit a rock or downed tree when mountain biking This more protected position of the derailleur assembly 10 of the present invention dramatically reduces this type of risk.

As shown in FIGS. 3, 3A,3B and 4, the basic element of the derailleur assembly is a pivot arm 11 located on a pin 12 fixed to the frame 110 or otherwise affixed to a bracket for mounting onto the frame 110 at an angle relative to the change sprocket assembly or rear sprocket nest 101. The upper end of the pivot arm supports a guide roller 30 as well as the upper end of the take-up idler arm 20 with a take-up roller 40 at the bottom opposite end of the take-up idler arm 20. The pivot pin 12 being at an angle tends to promote chain twist, but the sprockets themselves limit that motion to allow smooth change of position. Each of the roller sprockets 30 and 40 as shown has a small amount of gap between the take-up frame sides 21, 22 holding them which allow the rollers to 30 and 40 to shift slightly to reduce the amount of chain twist.

Figure 4:
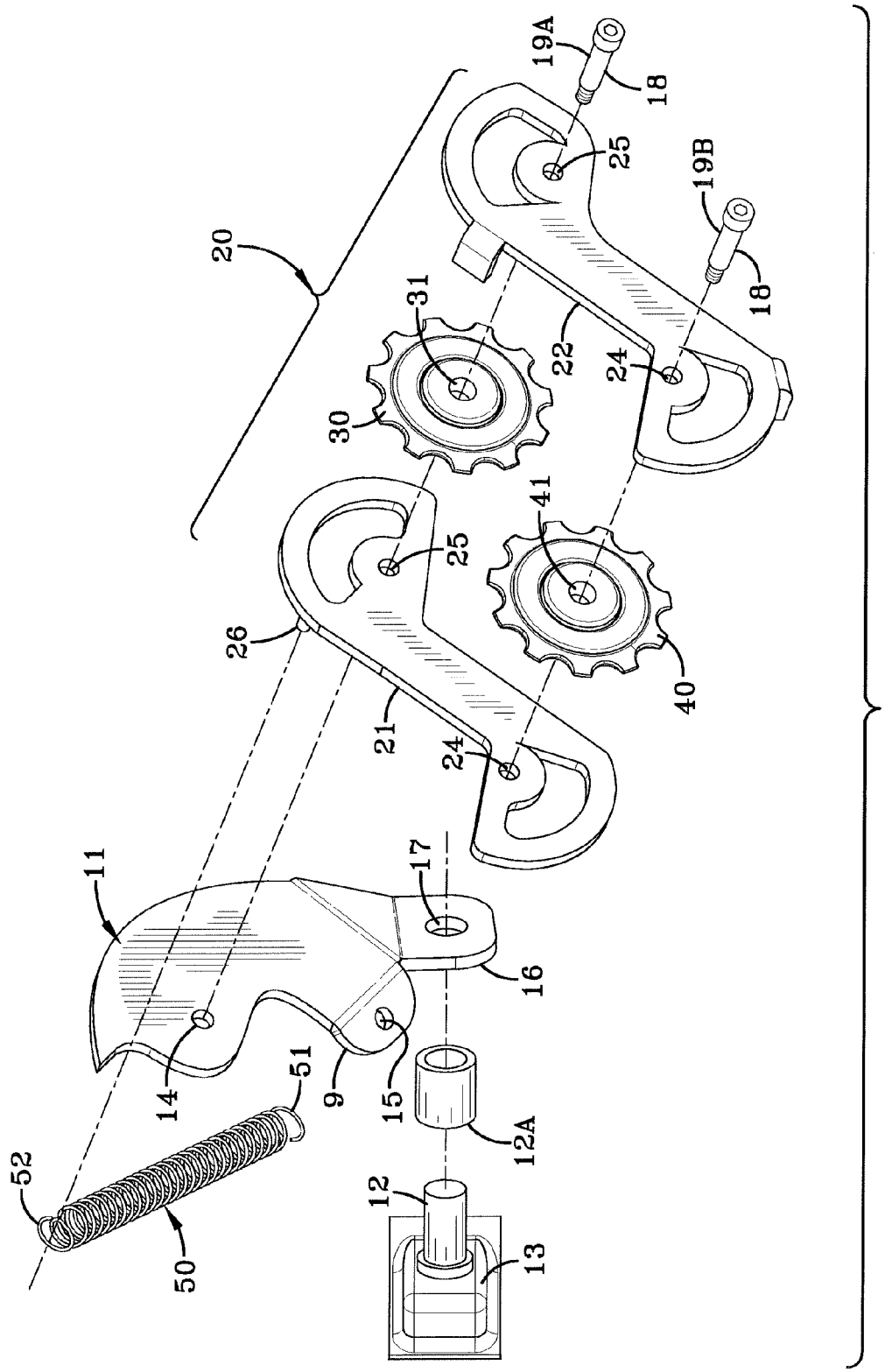
FIG. 4 is an exploded view of the derailleur assembly of FIG. 3.

As shown in FIG. 4 the rollers 30 and 40 are held between the frame sides 21,22 through openings 24,25 by threaded fasteners 19A,19B with a small tubular bearing 18 that acts as the bearing in the openings 31,41 of the sprockets 30,40, respectively. Fastener 19A has a longer threaded end for securing the take-up idler arm 20 at the tapped opening 14. The shift cable 109 is to be attached in the hole or opening 15. As further shown the guide feed arm 11 has a bent over portion 16 with a pivot hole 17 into which fits a tubular bearing sleeve 12A mounted on the pivot pin 12. A single spring 50 is shown that is connected at one end 51 to a bent over tab 19 at the bottom end of the guide feed arm 11 and is further connected at an opposite end 52 onto a stop pin 26 on the take-up idler arm 20.

Figure 5A:
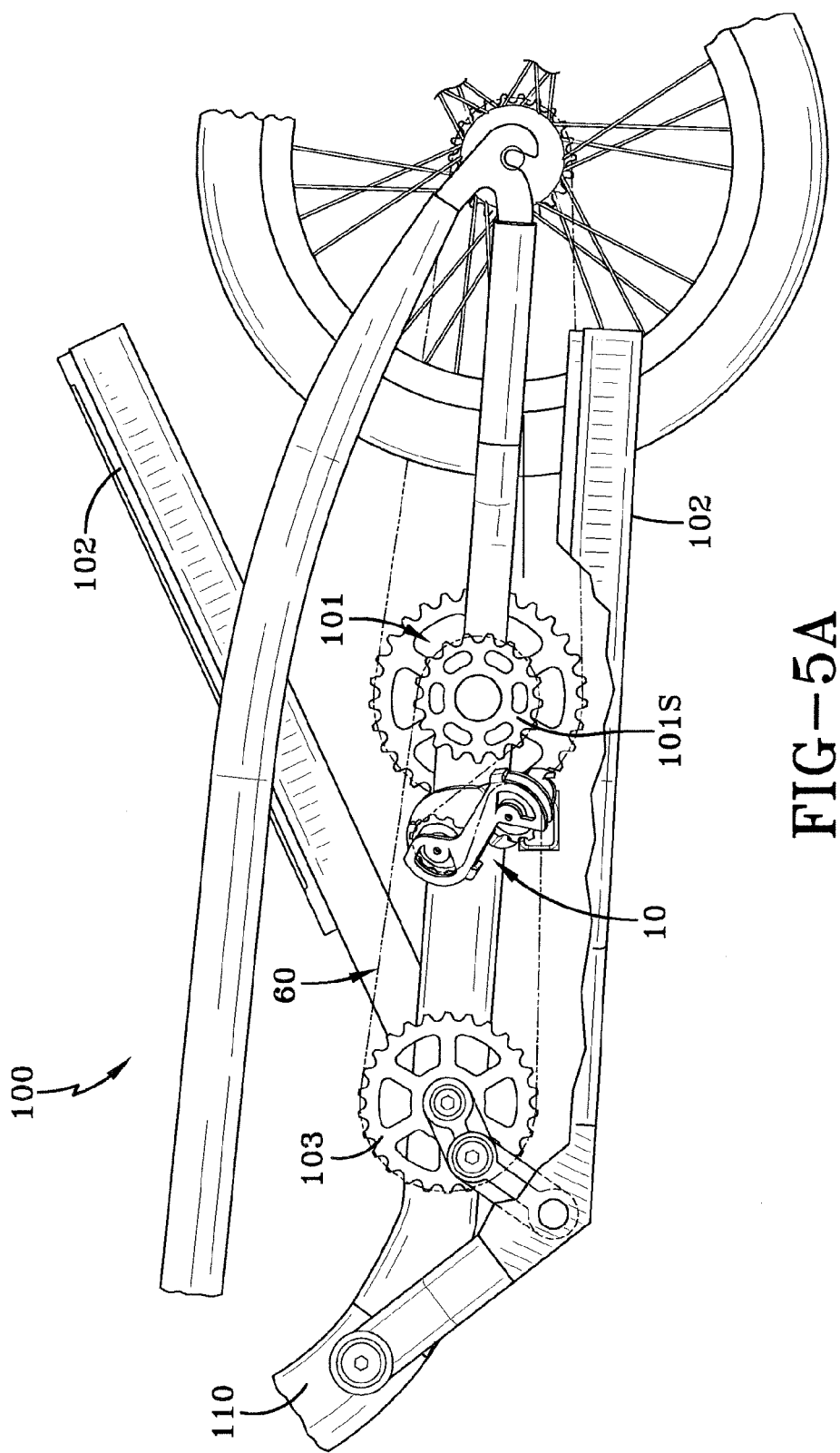
FIG. 5A is a partial plan view of the chain and derailleur wherein the small rear sprocket is engaged with the chain shown in dashed lines.
Figure 5B:
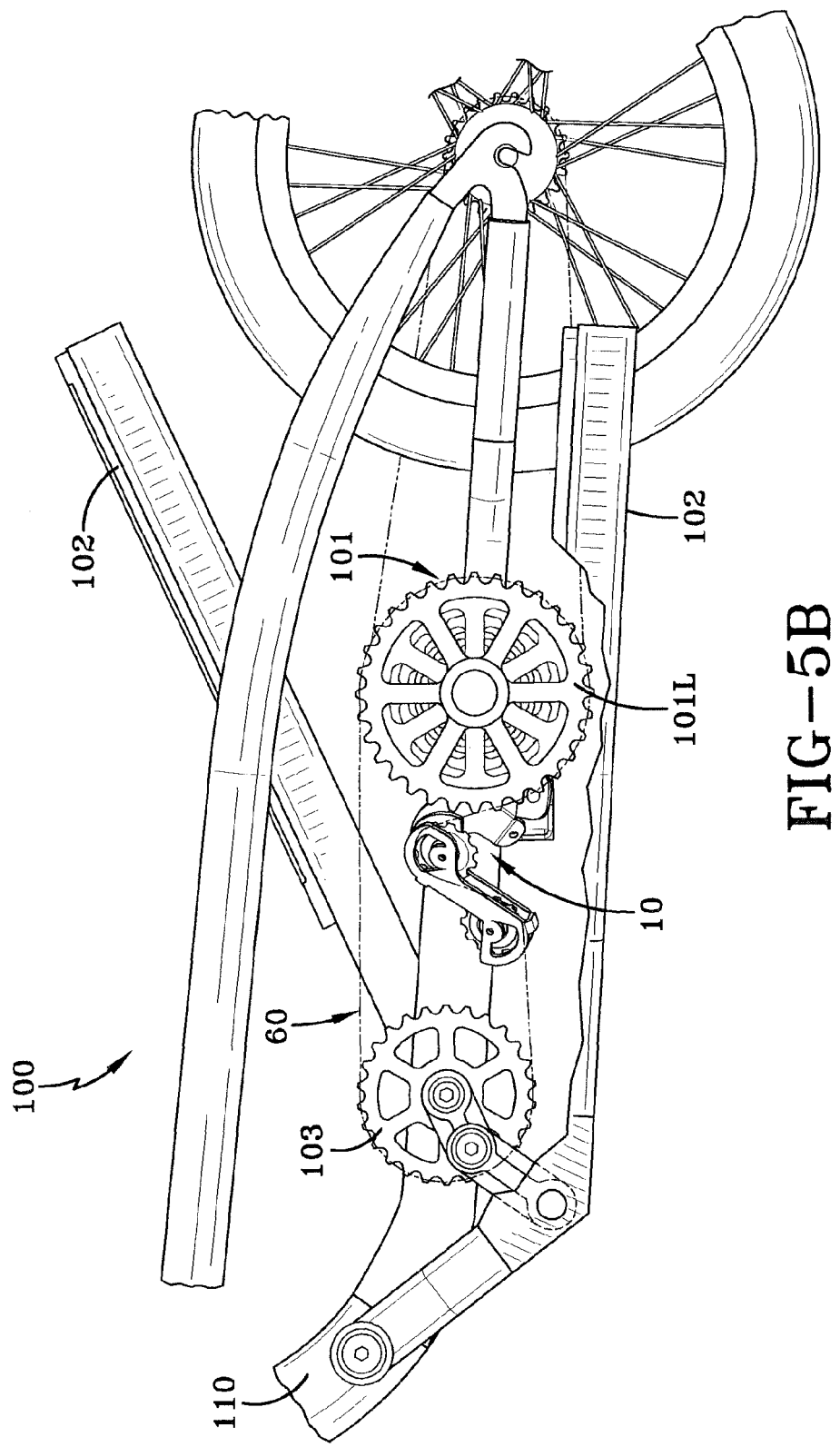
FIG. 5B is the schematic view of FIG. 5A, but with the large sprocket engaged with the chain shown in dashed lines.

In FIG. 5A and as is schematically shown in FIG. 10A (reversed looking from the opposite side), when a small sprocket 101S is selected, a long section of chain 60 must be stored in a back-and forth configuration adjacent to or beside the derailleur sprocket nest 101. In FIG. 5B and schematically in FIG. 10B but similarly reversed, when a large sprocket 101L is selected, the pivot arm angle allows the guide roller to drop and receive the chain in almost straight line from the drive sprocket 103.

A single spring 50 connected to the guide arm 11 and the angled pivot idler arm 20 supplies all the motion and take-up requirements for the system. When a chain 60 shift between small diameter sprockets in the sprocket nest is initiated, the chain 60 and the guide arm 11 are moved sideways out of line with the top driving section of chain to avoid interfering between chain sections moving in opposite directions.

Figure 11:
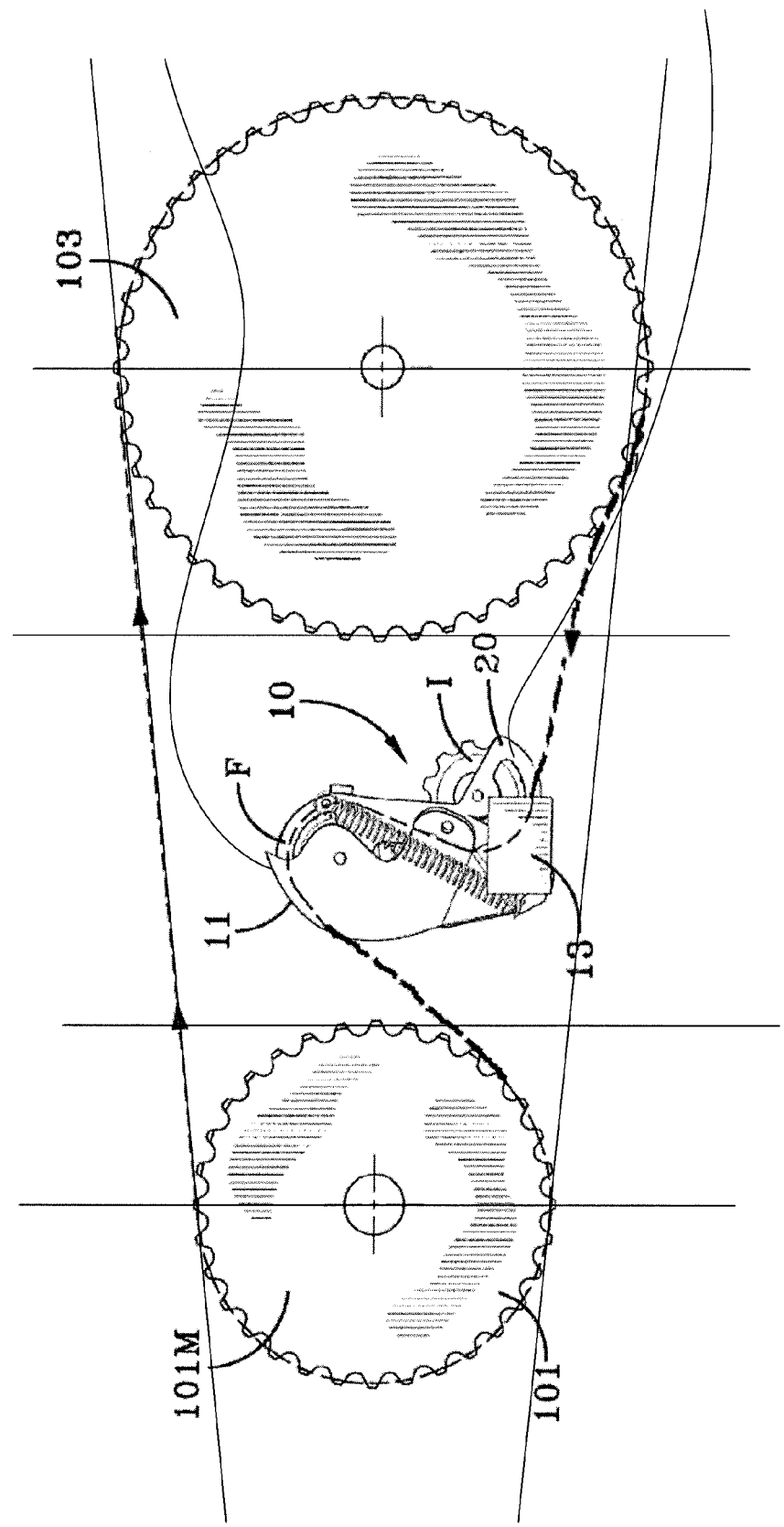
FIG. 11 is a schematic view of a rear sprocket and front drive sprocket and the space between the sprockets in which the derailleur can be disposed; and, FIGS. 12 and 13 are schematic views of aspects of the invention.

Referring back to FIGS. 3B and 4, the pin 12 is shown attached to a mounting bracket 13 which is to be attached by welding or otherwise fixed to the frame 110. The mounting bracket can be attached to the bottom of the frame, the side of the frame or the top of the frame. The base of the bracket 13 aligns with the frame 110, and the pin 12 is projecting at an angle to the inclined surface of the bracket 13. The inclined surface is oriented at an angle θ relative to the frame 110 as illustrated in FIGS. 9A,9B, and 9C. The angle θ should be equal to the tangent slope of the sprocket nest 101, as shown in FIGS. 9A, 9B and 9C, the angle θ was 30 degrees. The angled guide arm 11 fits over the pin 12 and is rotatable about the pin 12 while it translates back and forth to line up with the sprockets in the nest 101, and thus the guide arm 11 rotates forward and translates sideways. As shown in FIG. 11, one embodiment includes the mounting plate disposed along a plane generally orthogonal to the axis of the roller sprockets.

The angled guide arm 11 as shown has a projecting tab 9 with a hole 15 for securing the gear shifting rod or wire 109. The tab 9 is located in close proximity to the pivot pin 12 to exactly duplicate the control wire motion of a conventional derailleur on bicycles. The guide arm 11 is twisted about 30 degrees so that the orientation of the chain 60 passing through the guide rollers 30 and 40, shown as shallow toothed sprocket rollers, is substantially parallel to the drive sprockets and the rear sprockets of the nest 101.

Referring to FIGS. 10A, 10B and 10C, the single spring 50 connected near or at the pivot 12 provides torque through the chain take-up idler arm 20. When the chain 60 is on the major diameter rear sprocket 101L, the spring provided torque is modest but when the guide arm 11 arm rotates to the smaller sprocket 101S, the single spring 50 is stretched but acts over a shorter distance to provide torque. This means as the derailleur 10 is shifted upward through the gears, the spring 50 assist in the movement of the derailleur assembly 10 and insures the slack in the chain 60 is fully taken out by the chain take-up idler arm 20.

Particular attention in FIG. 10C is called to the chain 60 when moved onto the smallest rear sprocket 101S. In this position, the derailleur 10 is orientated such that the chain 60 can encircle substantially more than 180 degrees around the sprocket 101S. As shown, almost 240 degrees of the smallest sprocket 101S is engaged by the chain 60. This feature is very beneficial in that the wrapping of the chain enables more sprocket teeth to be engaged. In a conventional low hung derailleur, 180 degrees of engagement is the best to be hoped for; and typically less than 180 degrees is experienced. The device according to this present invention enables far more teeth to be engaged. This means that even a smaller sprocket diameter can be used increasing the range of gear ratios available in a single nest.

As further illustrated in FIG. 9B, the idler arm 20 is modified such that its orientation is centered or aligned with the middle sprocket 101M, but as shown in FIGS. 9A and 9C, is slightly canted at either extreme major or minor diameter sprockets at the roller feed end F sprocket 30 and the idler I sprocket 40 of the chain 60. This creates a slight twist in the chain 60, but because the guide rollers 30 and 40 have a gap or clearance when mounted in their respective frame sides 21, 22 in which they are held, they move laterally allowing the twist to straighten out relative to the sprocket to which it is attached. This along with the fact the single spring 50 provides less torque at both the top and the bottom of its range permits the chain 60 to straighten out. In one embodiments, the take up roller remains centered while the sprocket selector roller is slightly canted either at the extreme major diameter or minor diameter of the roller feed end.

Conventional derailleurs use massive spring force and therefore require precise parallel alignment. The derailleur 10 according to the present invention is greatly simplified in its design and thus can easily accommodate this small amount of chain twist. This assumes of course the adequate distance is provided between centers of the forward drive sprocket 103 and the rear stacked sprocket nest 101, for example at least 10 inches, preferably 11 inches for a 0.5 inch bicycle chain and a six sprocket nest. This for a six speed derailleur allows a sufficient length of chain 60 to allow the twist angle to be small enough to straighten out due to the flexibility of standard bicycle chain.

A unique feature of this new derailleur design is that it can be used with a nested and stacked rear sprocket nest combined with a multiple forward drive sprocket nest and is capable of chaining not only the rear gears, but the forward gears as well. Presently, two conventional derailleurs are required to develop adequate speed change on bicycles. The single spring tension of the present derailleur 10 of the present invention allows it to move the chain at both locations. While this has obvious cost benefits, it is believed the present inventions use of multiple forward sprockets is not providing the benefit for the cost required. This is true because of the duplication of gear ratios available means little or no real advantage is achieved.

A 27 speed derailleur system on a bicycle with rotating pedals actually provides about 8 distinct speeds with multiple redundant combinations requiring two sets of derailleur devices providing the intermediate speeds. The present invention derailleur 10 can provide a single location with a wider gear tooth range to equal the total gear ratio of a two derailleur bicycle system without the redundancy, reduced stress and wear of the multiple rear sprocket set and safer chain safety near the pedals.

The prior art has a 27 speed with a three sprocket nest at the pedal driving one of 9 rear wheel sprockets at the rear wheel derailleur positions providing duplicate intermediate speeds. The derailleur 10 of this invention offers a compact single control derailleur system without redundancy with equal step up ratios between speeds. This provides reduced stress and wear on the sprockets due to greater wrap around for small sprockets and greater safety near the pedals when a single chain location must be guarded instead of a 3 chain wide protected area.

The earlier described derailleur of FIGS. 1 through 5B has the normal tension spring action and stops on the guide arm 11 to stop the pin 26 set to produce rotation of the pivot arm about a pivot limited less than 180 degrees rotation. When additional rotation is required, a hub projection 80 about or near the pivot can be located to rest against the spring coils and prevent or limit the tension spring coils from reaching the center of rotation of the pivot arm, as shown in FIG. 6. In this case one of the limit stops on the guide arm 11 can be moved or eliminated. This effect was demonstrated on a scooter derailleur system. Wherein the correct selection of pivot projection in the shape of a cylindrical hub 80 with an appropriately sized cylinder diameter allowed the rotation to go well past the 180 degree rotation to well over 240 degrees represented as angle .alpha. This increased rotation can be designed to fit the need.

This rotation over 180 degree for an arm with a single tension spring drive provides several alternate configurations. The equivalence of the cylindrical hub to develop over 180 degrees rotation of a spring return tension spring arm as shown in FIG. 6 can be achieved by lancing a segment 90 of sheet metal adjacent to the hub or pivot and form it to project outwardly and act as a guide supporting the spring smoothly against the side coils of the tension spring, as shown in FIG. 7 represented by the angle .beta.

As shown in FIG. 8A, tension spring top swivel connector 86 may be built as a tube 86 with the ID swivel on a shaft or the pin 26 and the OD modified with a groove 88 to prevent the end twist loop of tension spring from falling off on a spring groove at the spring contact area.

As shown, the entire derailleur assembly 10 can occupy and function between the space defined as a pair of tangent lines between major driven and major diameter nest sprockets. However, it is important to note the ground clearance needed simply requires the derailleur and take-up assembly to occupy a space between the horizontal tangent lines of the largest sprocket diameters.

Furthermore, as shown in FIGS. 9A, 9B and 9C the rear sprocket nest has a conical linear tangency shown as straight but preferably, can be made having a non-linear tangency or a curved peripheral profile. In such a case, the straight line angle formed between the largest sprocket and the smallest sprocket can be used to set the pivot pin angle. This means the distance between the derailleur feed sprocket 30 and the different sized sprockets will vary. This variation can be accommodated without detriment due to the sole requirement of feeding the chain 60 onto a specific sprocket.

It is understood that because the system moves along a fixed angle set by the pivot, the sweep angle of the derailleur lies in a curved plane, accordingly the invention relies on a movement that uses this fact to set the appropriate variable distances between the derailleur guide feed roller sprocket 30 and the individual sprockets of the sprocket nest 101. Adjustment of these different aspects of the invention can be varied.

Figure 12:
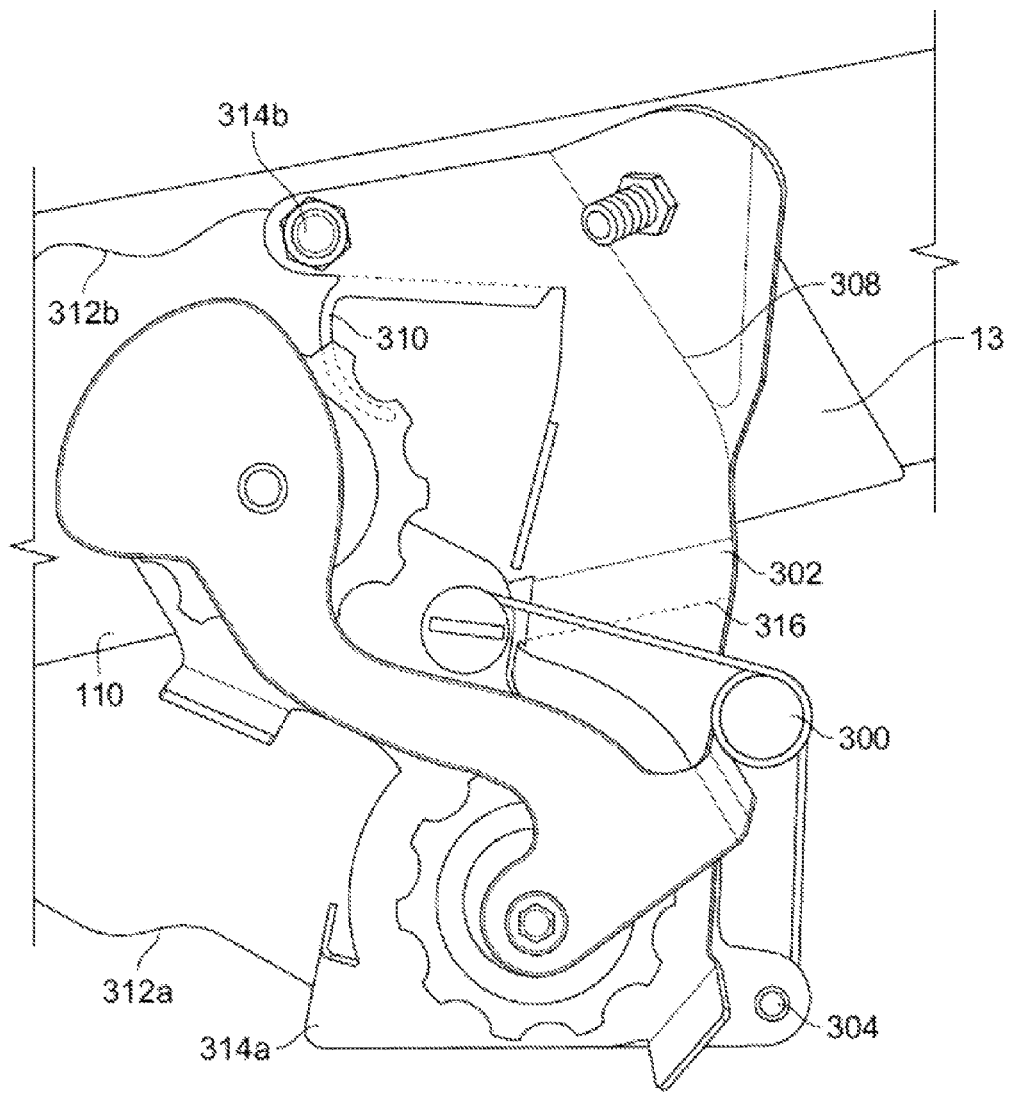
Figure 13:
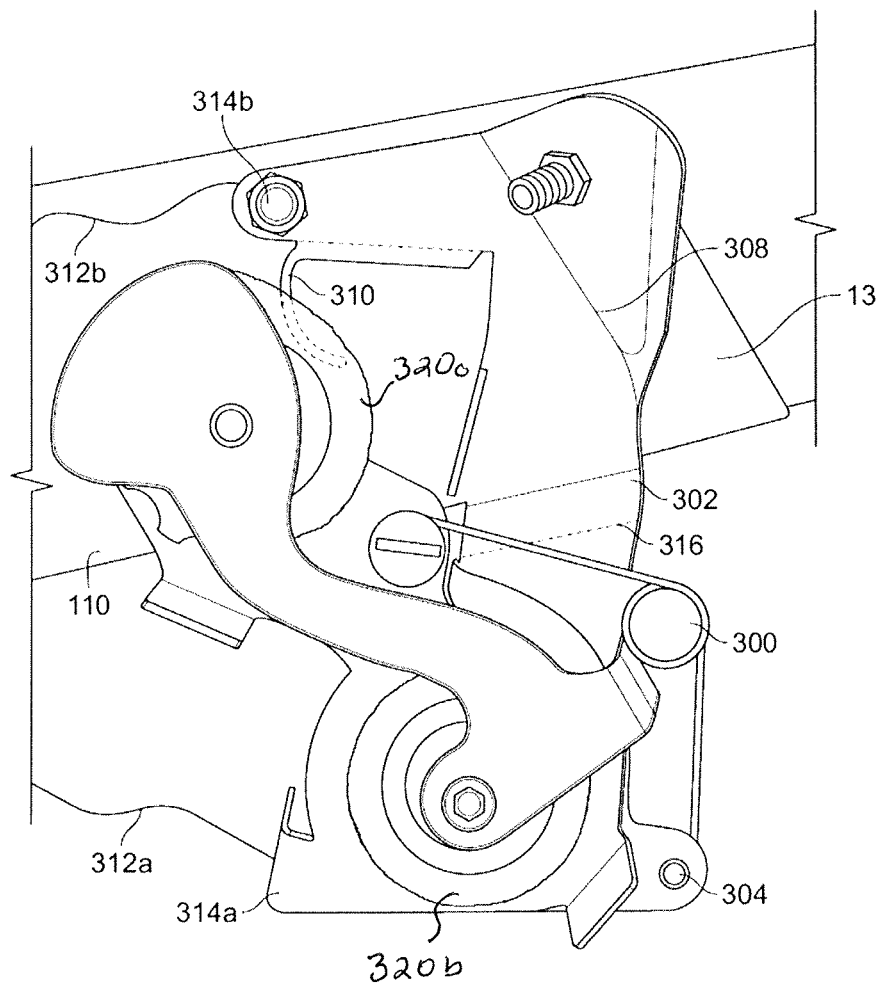

Referring for FIG. 12, in one embodiment, mounting plate 13 is disposed along a plane generally parallel to the axis of the roller sprockets 20 and 30 and parallel to frame 110. As shown, the mounting plate is attached to the bottom of the frame. In one embodiment, the mounting bracket can be attached to the top or side of the frame. The spring is a coil spring 300 with one end attached generally in the center of the take up idler arm and the other end attached to a connecting plate 302. The connecting plate is rotatably attached to the idler arm 20 and attachment idler arm spring attachment point 304. The connecting plate can include an angled portion 308 so that when the idler arm is moved, the roller sprockets move in a lateral direction in relation to a long axis of the frame causing the chain to move from sprocket to sprocket. The connector plate can also include angled portion 316 to properly position the guide arm. Referring to FIG. 13, in one embodiment, the chain guides 320a and 320b can be smooth.

An idler arm guard 310 can in attached to the connecting plate to assist in in preventing the connecting plate from interfering with movement by guiding the connecting plate along the mounting plate and frame. Cable 312a can be connected at cable connection point 314a so that when tension in applied to the cable the idler arm moves effecting the chain. In one embodiment, cable 312b can be attached a cable attachment point 314b.

When the mounting plate is attached to the top of the frame, the upper roller sprocket can be disposed above the axis of the drive axle or rear wheel axle so that the derailleur is disposed in the shifting area. The lower roller can be disposed below the axis of the drive sprocket or rear wheel. Further, the cable can cause the upper roller to move orthogonal to the long axis of the frame by either pulling the guide arm forward or in one embodiment, rearward.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A derailleur for moving a chain to a different sized sprocket in a drive sprocket nest comprising:
    a guide feed arm for directing a chain between one of multiple sprockets of the drive sprocket nest wherein the guide feed arm is rotatably mounted to a pivot pin attached to and projecting from a frame of a vehicle at an angle defined between a lengthwise axis of the frame and a tangent intersecting the outer perimeter of the sprockets of the drive sprocket nest so that said guide feed arm rotates about said pivot pin; wherein said guide feed arm causes said chain to move from a first pedal sprocket to a second pedal sprocket so that the chain can be moved about said drive sprocket nest;
    a guide roller rotatably attached to said guide feed arm that supports the chain so that when said guide feed arm rotates about said pivot pin, said guide roller moves the chain from one sprocket to another sprocket in the drive sprocket nests;
    a take-up idler arm wherein an upper end of the take-up idler arm is pivotally attached to said guide feed arm; wherein when the take-up idler arm is centered on a middle sprocket, the guide roller and the take-up roller are both aligned parallel and in the same plane with the middle sprocket of the sprocket nest; and, wherein the take-up idler arm, when moved from alignment with the middle sprocket, is canted on an angle at either extremes of the smallest and largest sprockets wherein the guide roller and take-up roller are not aligned parallel and in the same plane relative to the respective smallest or largest sprocket creating a twist in the chain which is straighten out by a movement of the guide roller and take-up roller by using a gap or clearance between the take-up roller of the take-up idler arm; and,
    a take-up roller attached to an opposite end of the take-up idler arm for taking up chain slack when said guide feed arm rotates about said pivot pin, said opposite end traces a fixed planar arcuate path along a sweep angle set and controlled by the rotation about said pivot pin.

2. The derailleur of claim 1 wherein said take-up roller and guide roller are disposed between a pair of take-up frame sides of the take-up idler arm.

3. The derailleur of claim 1 wherein said movement of said guide feed arm is moved by tensioning a first cable connected to said guide feed arm causing said guide roller to move in a lateral direction relative to a long axis of the frame of the vehicle causing the chain to move from one sprocket to another in the drive sprocket nest.

4. The derailleur of claim 1 wherein said excess slack in the chain is taken up in a slack area defined by an upper horizontal tangent intersecting a top perimeter of a largest sprocket in said drive sprocket nest and a lower horizontal tangent intersecting a bottom perimeter of said largest sprocket in said drive sprocket nest.

5. The derailleur of claim 1 wherein a slack area is defined by a vertical tangent on a forward point of the largest sprocket of said sprocket nest and a vertical tangent on a rearward point of a pedal sprocket.

6. The derailleur of claim 1 wherein said pivot end is carried by the frame and disposed in front of the center of the axis of said drive sprocket nest.

7. The derailleur of claim 1 wherein a distance of at least 10 inches is provided between the drive sprocket and the driven sprocket.

8. A derailleur for moving a chain to a different sprockets in a drive sprocket nest and different sprockets in a pedal sprocket nest comprising:
    a guide feed arm having a pivot end rotatably mounted to a pivot pin projecting from a frame of a vehicle so that said guide feed arm rotates about said pivot pin;
    an opposite upper chain guide end included in said guide feed arm that supports a guide roller and traces a fixed plane acruate path along a sweep angle set and controlled by the rotation of said guide feed arm about said pivot pin;
    said guide roller rotatably carried by said guide feed arm that supports the chain so that said chain contacts over ½ the perimeter of a sprocket within said drive sprocket nest;
    a first cable connected to said guide feed arm so that when said first cable is tensioned, said guide roller causes the chain to move from one sprocket to another in said drive sprocket nest;
    a take-up idler arm wherein an upper end of the take-up idler arm is pivotally attached to said guide feed arm; wherein when the take-up idler arm is centered on a middle sprocket, the guide roller and the take-up roller are both aligned parallel and in the same plane with the middle sprocket of the sprocket nest; and wherein the take-up idler arm when moved from alignment with the middle sprocket is canted on an angle at either extremes of the smallest and largest sprockets wherein the guide roller and take-up roller are not aligned parallel and in the same plane relative to the respective smallest or largest sprocket creating a twist in the chain which is straighten out by a movement of the guile roller and take-up roller by using a gap or clearance between the take-up roller of the take-up idler arm; and
    a tension spring biasing the guide feed arm and connected at or near the pivot end of the guide feed arm and the take-up idle arm; and,
    a take-up roller rotatably attached to said idler take-up arm for taking up chain slack when said guide feed arm rotates about said pivot pin.

9. The derailleur of claims 8 including a lancing segment adjacent to a pivot to support the tension spring smoothly against the side coils of the spring.

10. The derailleur of claim 8 wherein excess slack in the chain is disposed in an area defined by a horizontal tangent of the top perimeter of a pedal sprocket and a largest sprocket in said drive sprocket nest and a horizontal tangent of the bottom perimeter of a pedal sprocket and a largest sprocket in said drive sprocket nest.

11. The derailleur of claim 8 wherein said derailleur is disposed in a derailleur area defined by a vertical tangent at a rearward point of a largest sprocket of said pedal sprocket nest, horizontal tangent of the top perimeters of the largest sprockets of the pedal and drive sprocket nest, vertical tangent at the forward point of the perimeter of the largest sprocket of said drive sprocket nest and horizontal tangent of the bottom perimeter of the largest sprockets of the pedal and drive sprocket nests.

12. The derailleur of clam 8 wherein the roller feed sprocket forces the chain upwards so that the chain contacts over ½ the perimeter of a pedal sprocket.

\* \* \* \* \*